United States Patent
Hinton et al.

[11] Patent Number: 6,099,088
[45] Date of Patent: Aug. 8, 2000

[54] TRACTION ASSEMBLY FOR A WORK MACHINE

[75] Inventors: David Hinton, Mt. Zion; Douglas W. Bell, Mattoon; David Martin, Decatur, all of Ill.

[73] Assignee: Caterpillar Inc., Peoria, Ill.

[21] Appl. No.: 09/162,396

[22] Filed: Sep. 28, 1998

[51] Int. Cl.[7] .............................. B60T 8/24; B60T 8/34
[52] U.S. Cl. ................. 303/139; 303/113.2; 73/DIG. 3; 180/197
[58] Field of Search ............................... 303/139, 113.2, 303/166; 180/197; 73/129, DIG. 3

[56] References Cited

U.S. PATENT DOCUMENTS

| | | | |
|---|---|---|---|
| 4,989,686 | 2/1991 | Miller et al. | 180/197 |
| 5,016,724 | 5/1991 | Steinhagen et al. | 180/249 |
| 5,071,396 | 12/1991 | Kobayashi | 180/249 |
| 5,161,636 | 11/1992 | Haupt et al. | 180/248 |
| 5,168,953 | 12/1992 | Naito | 180/197 |
| 5,215,160 | 6/1993 | Williams et al. | 180/197 |
| 5,505,267 | 4/1996 | Orbach et al. | 172/3 |
| 5,566,776 | 10/1996 | Iwata | 180/197 |
| 5,927,422 | 7/1999 | Schakel | 180/197 |
| 5,927,426 | 7/1999 | Hall et al. | 180/197 |

*Primary Examiner*—Douglas C. Butler
*Attorney, Agent, or Firm*—Bradford G. Addison

[57] ABSTRACT

A traction assembly of a work machine having (i) a differential housing having an axle passageway extending therethrough and (ii) an axle positioned within the axle passageway is disclosed. The traction assembly includes a gear mechanically coupled to the axle. The gear includes (i) an outer peripheral surface having a plurality of sensor teeth defined therein, (ii) a first shoulder extending in a first lateral direction, and (iii) a second shoulder extending in a second direction. The traction assembly also includes a bearing assembly attached to the differential housing, wherein (i) the bearing assembly includes a first bearing member and a second bearing member, (ii) the gear is interposed between the first bearing member and the second bearing member, (iii) the first shoulder of the gear contacts a first journal surface of the first bearing member, and (iv) the second shoulder of the gear contacts a second journal surface of the second bearing member. The traction assembly further includes a sensor for detecting rotation of the gear relative to the differential housing and generating a sensor signal in response thereto.

18 Claims, 4 Drawing Sheets

TRACTION ASSEMBLY FOR A WORK MACHINE

TECHNICAL FIELD OF THE INVENTION

The present invention relates generally to a work machine, and more particularly to a traction assembly for a work machine.

BACKGROUND OF THE INVENTION

Typically, work machines, such as mining trucks are equipped with a traction assembly or device. These traction devices operate to automatically increase the traction of the work machine by decreasing the rotation of a wheel that is slipping on a relatively slick surface (e.g. a gravel surface). The slipping is detected by sensor assemblies included in the traction device that measure the rotation rate of each wheel axle. Specifically, when the traction device detects (via one of the sensor assemblies) that a wheel axle is rotating at an unusually high rate as compared to the rotation rates of the other wheel axles, the traction device sends a signal to a mechanism that decreases the rotation rate of that wheel axle thereby decreasing the rotation rate of the slipping wheel. Decreasing the rotation rate of the slipping wheel increases the traction of the work machine.

In order to measure the rotation rate of the wheel axle in the above described manner, some traction devices locate the sensor assembly in the spindle of the wheel group of the work machine. However, locating the sensor assembly in the spindle makes the sensor assembly difficult to service. For example, a relatively large number of components of the work machine must be removed before a technician can gain access to the sensor assembly. Having a sensor assembly which is difficult to service increases the maintenance cost of the work machine.

What is needed therefore is a traction assembly for a work machine which overcomes the above-mentioned drawback.

DISCLOSURE OF THE INVENTION

In accordance with a first embodiment of the present invention, there is provided a traction assembly of a work machine having (i) a differential housing having an axle passageway extending therethrough and (ii) an axle positioned within the axle passageway. The traction assembly includes a gear mechanically coupled to the axle. The gear includes (i) an outer peripheral surface having a plurality of sensor teeth defined therein, (ii) a first shoulder extending in a first lateral direction, and (iii) a second shoulder extending in a second direction. The traction assembly also includes a bearing assembly attached to the differential housing, wherein (i) the bearing assembly includes a first bearing member and a second bearing member, (ii) the gear is interposed between the first bearing member and the second bearing member, (iii) the first shoulder of the gear contacts a first journal surface of the first bearing member, and (iv) the second shoulder of the gear contacts a second journal surface of the second bearing member. The traction assembly further includes a sensor for detecting rotation of the gear relative to the differential housing and generating a sensor signal in response thereto.

In accordance with a second embodiment of the present invention, there is provided a work machine. The work machine includes a differential housing having an axle passageway extending therethrough and an axle positioned within the axle passageway. The work machine also includes a gear mechanically coupled to the axle. The gear includes (i) an outer peripheral surface having a plurality of sensor teeth defined therein, (ii) a first shoulder extending in a first lateral direction, and (iii) a second shoulder extending in a second direction. The traction assembly further includes a bearing assembly attached to the differential housing, wherein (i) the bearing assembly includes a first bearing member and a second bearing member, (ii) the gear is interposed between the first bearing member and the second bearing member, (iii) the first shoulder of the gear contacts a first journal surface of the first bearing member, and (iv) the second shoulder of the gear contacts a second journal surface of the second bearing member. The traction assembly also includes a sensor for detecting rotation of the gear relative to the differential housing and generating a sensor signal in response thereto.

BEST MODE FOR CARRYING OUT THE INVENTION

Figure 1:
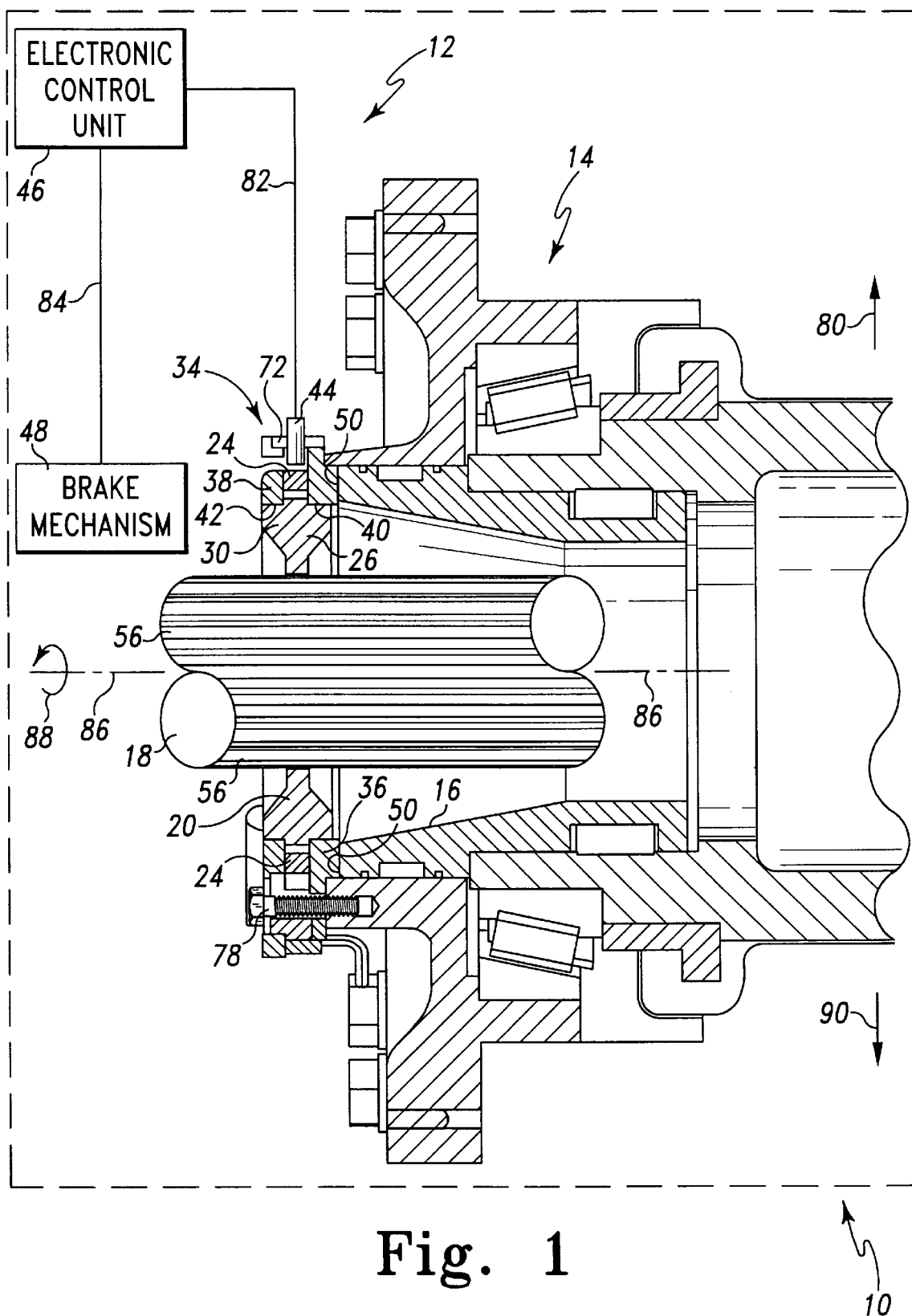
FIG. 1 is a partial cross sectional, partial schematic view of a work machine which incorporates the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is schematically shown a work machine 10 which incorporates the features of the present invention therein. Work machine 10 includes a differential housing 14 having (i) an axle passageway 16 extending therethrough and (ii) a coupling surface 50 which surrounds axle passageway 16. Work machine 10 also includes an axle 18 having a plurality of spline teeth 56 (also see FIG. 6) positioned within axle passageway 16. Work machine 10 further includes a traction assembly 12.

Figure 6:
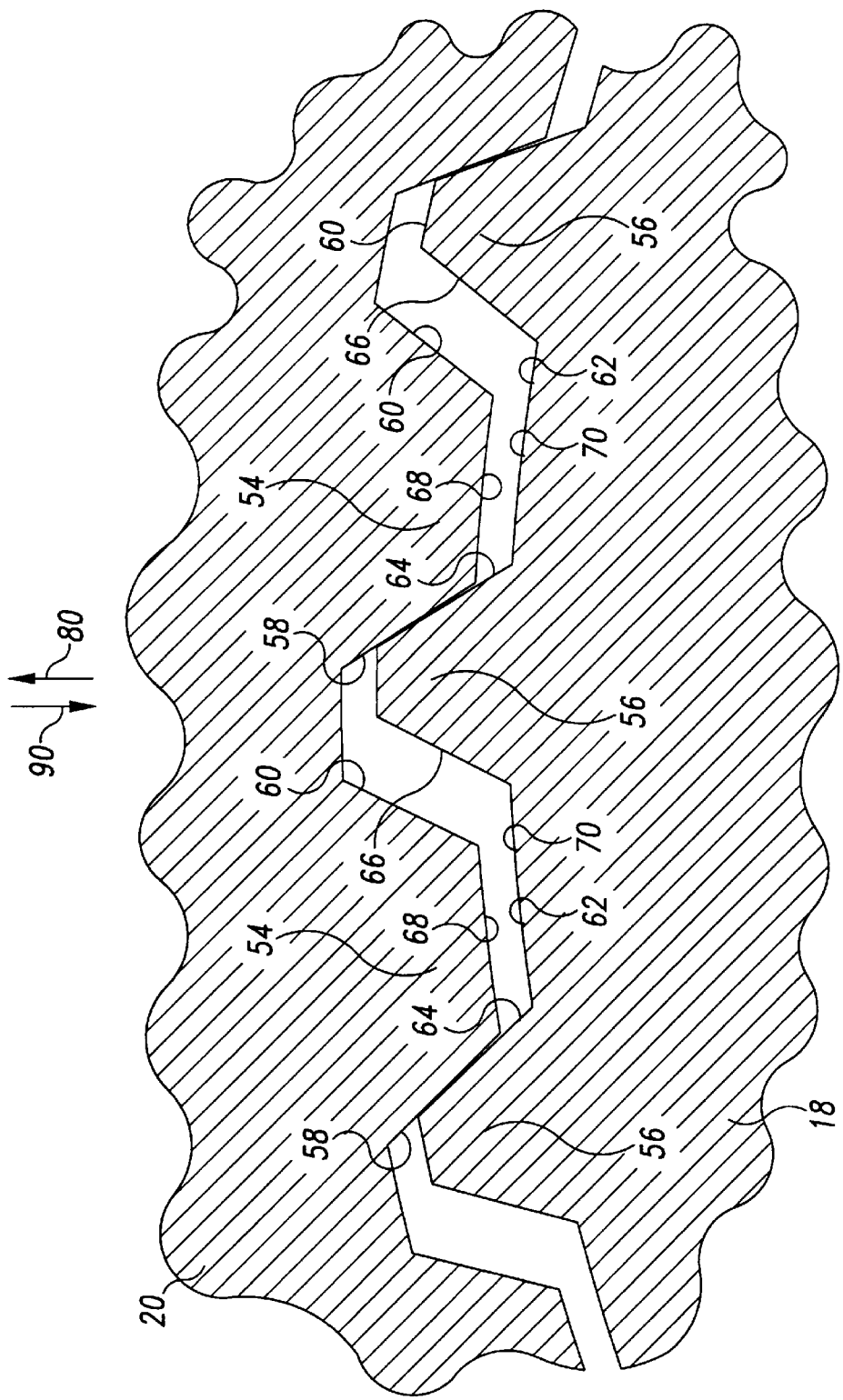
FIG. 6. is an enlarged fragmentary cross sectional view of the gear and an axle of the traction assembly of the work machine of FIG. 1.

Referring now to FIG. 6, each adjacent pair of spline teeth 56 of axle 18 define a spline gap 62. Spline gap 62 defines a leading spline gap surface 64 and a trailing spline gap surface 66. Spline gap 62 also defines a valley surface 70 interposed between each adjacent pair of spline teeth 56.

As shown in FIGS. 1–5, traction assembly 12 includes a gear 20, a bearing assembly 34, a sensor 44, an electronic control unit 46, and a brake assembly 48. As shown more clearly in FIGS. 4 and 5, gear 20 includes (i) an outer peripheral surface 22 having a plurality of sensor teeth 24 defined therein, (ii) a shoulder 26 extending in a lateral direction as indicated by arrow 28, and (iii) a shoulder 30 extending in a lateral direction as indicated by arrow 32. Gear 20 further includes an inner peripheral surface 52 having a plurality of spline teeth 54 formed thereon. As shown in FIG. 6, each spline tooth 54 includes a leading spline tooth surface 58 and a trailing spline tooth surface 60. Leading spline tooth surface 58 defines a lowermost edge surface 68.

Figure 2:
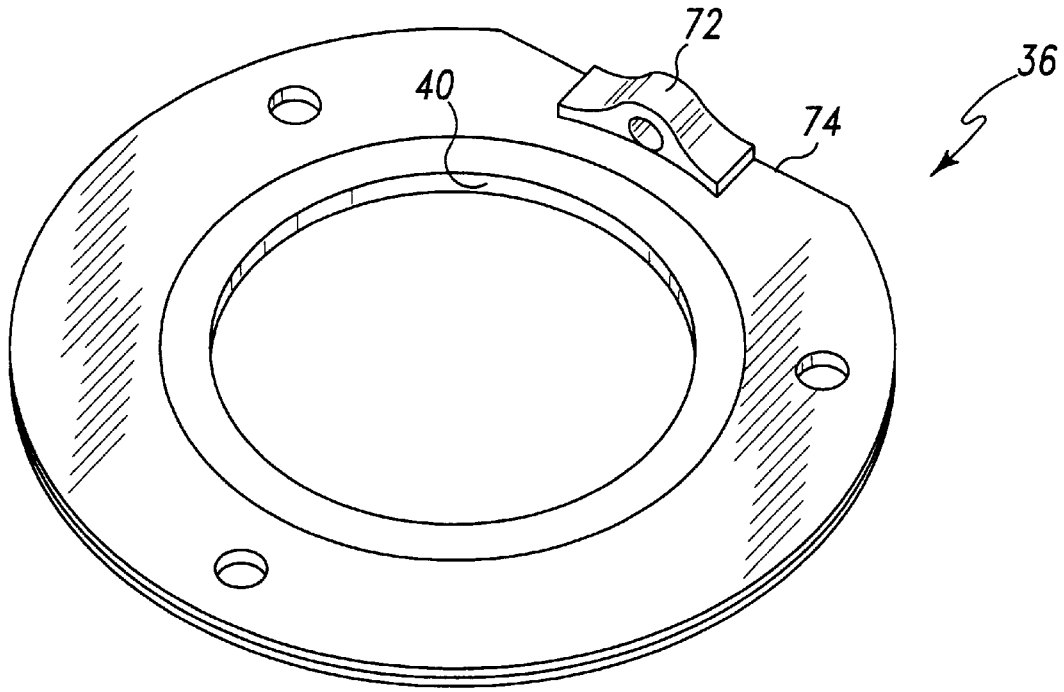
FIG. 2 is a perspective view of a bearing member of a traction assembly of the work machine of FIG. 1.
Figure 3:
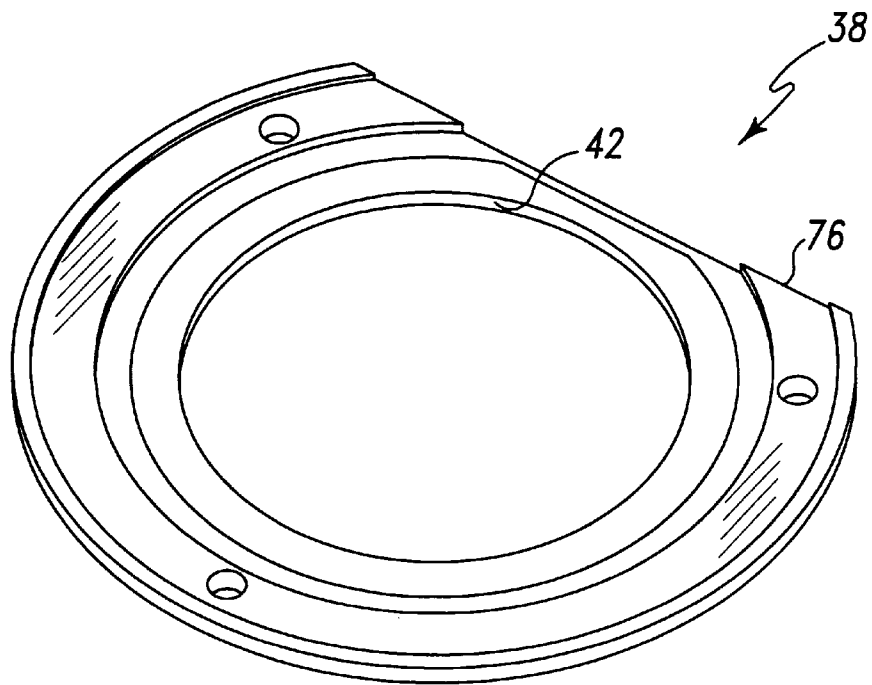
FIG. 3 is a perspective view of another bearing member of the traction assembly of the work machine of FIG. 1.
Figure 5:
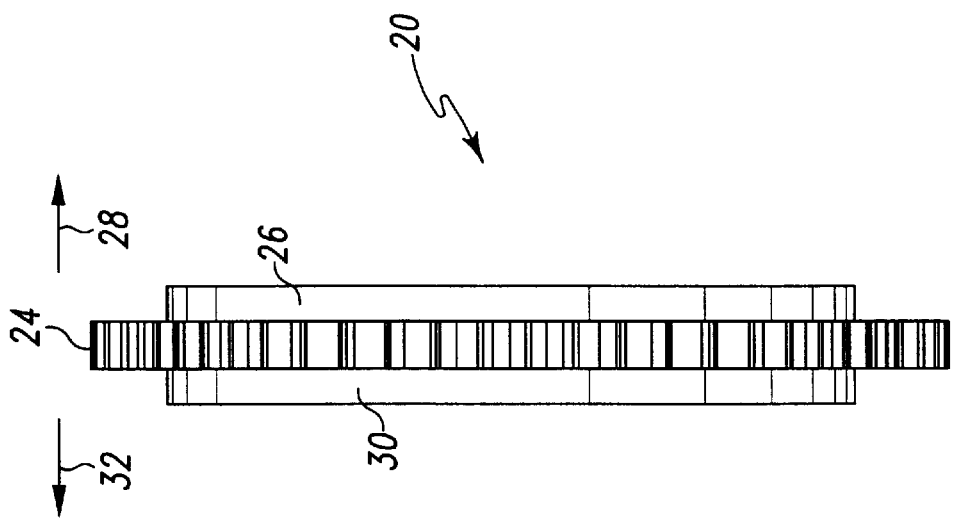
FIG. 5 is a side elevational view of the gear of FIG. 4.
Figure 4:
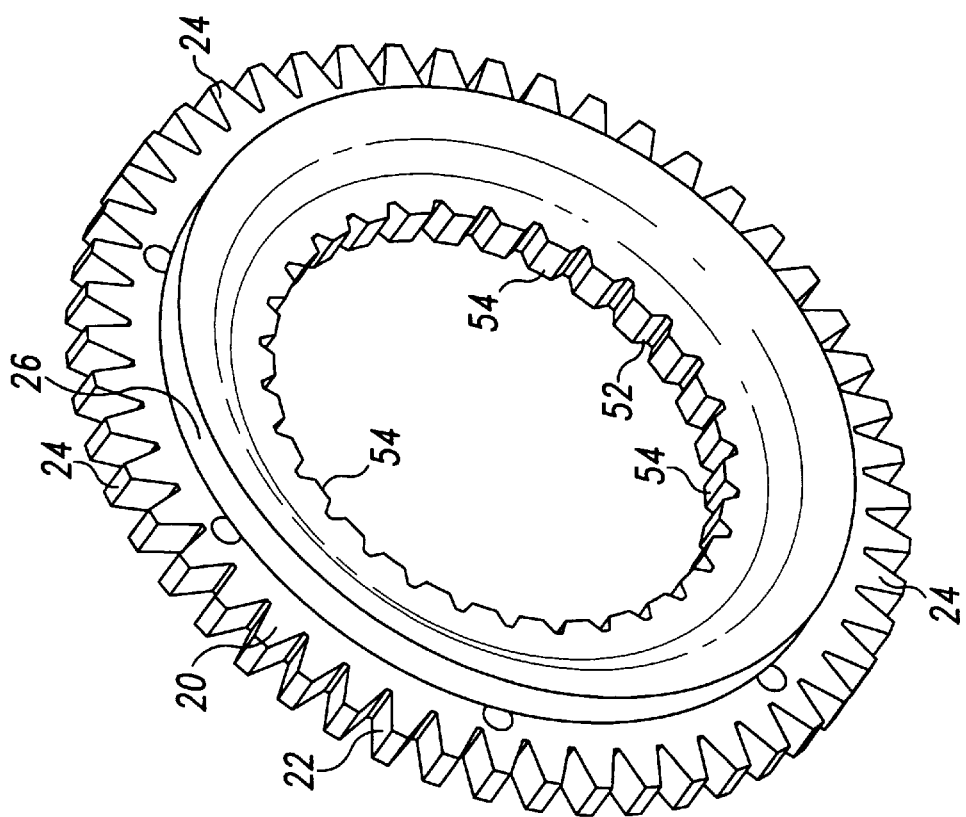
FIG. 4 is a perspective view of a gear of the traction assembly of the work machine of FIG. 1.

As shown in FIGS. 2 and 3, bearing assembly 34 includes a bearing member 36 and a bearing member 38. In addition, each bearing member 36 and 38 has a cutout area 74 and a cut out area 76 respectively defined therein. Bearing member 36 includes a sensor bracket 72 secured thereto adjacent to cutout area 74. Bearing members 36 and 38 also have journal surfaces 40 and 42 respectively defined thereon.

Referring now to FIG. 1, gear 20 is positioned relative to bearing assembly 34 such that gear 20 is interposed between bearing member 36 and bearing member 38. Gear 20 is further positioned relative to bearing assembly 34 such that (i) shoulder 26 of gear 20 contacts journal surface 40 of bearing member 36, and (ii) shoulder 30 of gear 20 contacts journal surface 42 of bearing member 38. Furthermore, each bearing member 36 and 38 is positioned relative to each other such that cutout areas 74 and 76 are adjacent to one another.

Bearing assembly 34 (with gear 20 interposed between bearing member 36 and 38) is secured directly to coupling surface 50 of differential housing 14 with a number of bolts 78 such that axle 18 extends through bearing member 36, gear 20, and bearing member 38 as shown in FIG. 1. In addition, bearing member 36, gear 20, and bearing member 38 are positioned relative to axle 18 such that spline teeth 54 of gear 20 are meshingly engaged with spline teeth 56 of axle 18 as shown in FIG. 6. Specifically, when a spline tooth 54 is positioned in a respective spline gap 62, (i) leading spline tooth surface 58 is respectively positioned in contact with leading spline gap surface 64 at all times during operation of traction assembly 12, and (ii) trailing spline tooth surface 60 is spaced apart from trailing spline gap surface 66 at all times during operation of traction assembly 12. In addition, it should be understood that lowermost edge surface 68 is spaced apart from valley surface 70 at all times during operation of traction assembly 12.

It should be appreciated that having gear 20 positioned relative to bearing assembly 34, attached to coupling surface 50, and meshingly engaged with axle 18 in the above described manner allows gear 20 to rotate relative to differential housing 14. Specifically, having gear 20 meshingly engaged with axle 18 in the above described manner causes gear 20 to rotate relative to differential housing 14 as axle 18 rotates around a central axis 86 in a direction indicated by arrow 88.

Sensor 44 is positioned within sensor bracket 72 such that sensor 44 extends near cutout area 74 and cutout area 76. Sensor 44 is electrically coupled to electronic control unit 46 via electrical line 82 and electronic control unit 46 is electrically coupled to brake mechanism 48 via electrical line 84. Having sensor 44 located as described above positions an end of sensor 44 at a predetermined distance from sensor teeth 24 of gear 20 such that sensor 44 can detect the rotation of gear 20 (and thus rotation of axle 18) relative to differential housing 14 and generate a sensor signal in response thereto. One sensor 44 that can be used in the present invention is available from The Morey Corporation located in Downers Grove, Ill., as catalogue number CAT1440178.

Industrial Applicability

During use of work machine 10 and traction assembly 12, axle 8 rotates around central axis 86 in the direction indicated by arrow 88. Rotation of axle 18 in the above described manner also causes gear 20 to rotate around central axis 86 in the direction indicated by arrow 88. Rotation of gear 20 causes sensor teeth 24 to pass by sensor 44 at a predetermined distance which in turn causes sensor 44 to send a sensor signal to electronic control unit 46 via electrical line 82. Electronic control unit 46 then sends a brake signal to brake assembly 48 via electrical line 84 if electronic control unit 46 determines that axle 18 is coupled to a wheel (not shown) that is slipping. Brake assembly 48 applies a stopping force to oppose rotation of axle 18 in response to the brake signal. Opposing the rotation of axle 18 in a slipping situation helps increase the traction of work machine 10. However, it should be understood that electronic control unit 46 only sends a brake signal to brake assembly 48 if electronic control unit 46 determines that axle 18 is coupled to a wheel (not shown) that is slipping (e.g. if the wheel is slipping on a relatively slick surface such as gravel). Moreover, it should be understood that each axle of work machine 10 is equipped with a sensor 44, a bearing assembly 34, and a gear 20 so that electronic control unit 46 can monitor the traction status of all the wheels of work machine 10.

It should be appreciated that axle 18 tends to radially flex and bend relative to gear 20 during the use of traction assembly 12. Therefore, having spline teeth 54 and spline teeth 56 positioned relative to one another as described above in reference to FIG. 6, in particular having lowermost edge surface 68 spaced apart from valley surface 70 at all times during operation of traction assembly 12, is an advantage of the present invention. Specifically, the above described spline teeth arrangement allows the aforementioned radial movement of axle 18 relative to gear 20 (e.g. in the directions indicated by arrows 80 and 90 (see FIGS. 1 and 6)) while substantially preventing any radial loads being imparted to gear 20. In other words, the spline teeth arrangement is "loose" enough such that it allows axle 18 to radially move or flex relative to gear 20 while preventing axle 18 from contacting gear 20 in such a manner so as to cause gear 20 to move in a radial direction (e.g. in the directions indicated by arrows 80 and 90 (see FIGS. 1 and 6)). Preventing the radial movement of gear 20 is important since sensor teeth 24 must be kept a predetermined distance away from sensor 44 in order for sensor 44 to accurately detect the rotation of gear 20. Thus, it should be understood that without the above described spline teeth arrangement, the radial movement of axle 18 would cause gear 20 to move such that sensor teeth 24 would no longer be located at the predetermined distance from sensor 44.

It should also be appreciated that securing bearing assembly 34 in direct contact with coupling surface 50 of differential housing 14 is another advantage of the present invention. Specifically, securing bearing assembly 34 in the above described manner makes bearing assembly 34, sensor 44, and gear 20 easily accessible for servicing which decreases the maintenance cost of work machine 10.

This is in contrast to other traction assembly designs that locate components of the traction assembly (e.g. the sensor) in the spindle of a wheel group of the work machine. Locating traction assembly components in the spindle makes the traction assembly difficult to service. For example, a relatively large number of components of the work machine must be removed before a technician can gain access to the traction assembly when components thereof are located in the spindle of the wheel group.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A traction assembly of a work machine having (i) a differential housing having an axle passageway extending therethrough, (ii) an axle positioned within the axle passageway, and (iii) a coupling surface defined on the differential housing such that the coupling surface is positioned outside of the axle passageway, comprising:

a gear mechanically coupled to said axle, said gear includes (i) an outer peripheral surface having a plurality of sensor teeth defined therein, (ii) a first shoulder extending in a first lateral direction, and (iii) a second shoulder extending in a second lateral direction;

a bearing assembly attached to said coupling surface defined on said differential housing, wherein (i) said bearing assembly includes a first bearing member and a second bearing member, (ii) said gear is interposed between said first bearing member and said second bearing member, (iii) said first shoulder of said gear contacts a first journal surface of said first bearing member, and (iv) said second shoulder of said gear contacts a second journal surface of said second bearing member; and a sensor for detecting rotation of said gear relative to said differential housing and generating a sensor signal in response thereto, wherein when said bearing assembly is attached to said coupling surface said bearing assembly and said gear are both positioned outside of said axle passageway.

2. The assembly of claim 1, further comprising an electronic control unit which receives said sensor signal and generates a brake signal in response thereto.

3. The assembly of claim 2, further comprising a brake assembly which receives said brake signal and applies a stopping force to oppose rotation of said axle in response thereto.

4. The assembly of claim 1, wherein:

said coupling surface surrounds said axle passageway, and said bearing assembly is secured directly to said coupling surface.

5. The assembly of claim 1, wherein:

said gear further includes an inner peripheral surface having a plurality of first spline teeth, said axle includes a plurality of second spline teeth, and said plurality of first spline teeth are meshingly engaged with said plurality of second spline teeth.

6. The assembly of claim 5, wherein:

each of said plurality of first spline teeth include a leading spline tooth surface and a trailing spline tooth surface, each adjacent pair of second spline teeth define a spline gap which defines a leading spline gap surface and a trailing spline gap surface, and when one spline tooth of said first plurality of spline teeth is positioned in a respective spline gap, (i) said leading spline tooth surface is respectively positioned in contact with said leading spline gap surface at all times during operation of said traction assembly, and (ii) said trailing spline tooth surface is spaced apart from said trailing spline gap surface at all times during operation of said traction assembly.

7. The assembly of claim 6, wherein:

said leading spline tooth surface defines a lowermost edge surface, said spline gap defines a valley surface interposed between said each adjacent pair of second spline teeth, and said lowermost edge surface is spaced apart from said valley surface at all times during operation of said traction assembly.

8. The assembly of claim 1, wherein:

said first bearing member includes a sensor bracket secured thereto, and said sensor is secured to said sensor bracket.

9. The assembly of claim 1, wherein:

said first bearing member defines a first cutout area, said second bearing member defines a second cutout area which is aligned with said first cutout area, and said sensor is positioned within said first cutout area and said second cutout area.

10. A work machine, comprising:

a differential housing having an axle passageway extending therethrough;

a coupling surface defined on said differential housing such that said coupling surface is positioned outside of said axle passageway;

an axle positioned within the axle passageway;

a gear mechanically coupled to said axle, said gear includes (i) an outer peripheral surface having a plurality of sensor teeth defined therein, (ii) a first shoulder extending in a first lateral direction, and (iii) a second shoulder extending in a second lateral direction;

a bearing assembly attached to said coupling surface defined on said differential housing, wherein (i) said bearing assembly includes a first bearing member and a second bearing member, (ii) said gear is interposed between said first bearing member and said second bearing member, (iii) said first shoulder of said gear contacts a first journal surface of said first bearing member, and (iv) said second shoulder of said gear contacts a second journal surface of said second bearing member; and a sensor for detecting rotation of said gear relative to said differential housing and generating a sensor signal in response thereto, wherein when said bearing assembly is attached to said coupling surface said bearing assembly and said gear are both positioned outside of said axle passageway.

11. The work machine of claim 10, further comprising an electronic control unit which receives said sensor signal and generates a brake signal in response thereto.

12. The work machine of claim 11, further comprising a brake assembly which receives said brake signal and applies a stopping force to oppose rotation of said axle in response thereto.

13. The work machine of claim 10, wherein:

said coupling surface surrounds said axle passageway, and said bearing assembly is secured directly to said coupling surface.

14. The work machine of claim 10, wherein:

said gear further includes an inner peripheral surface having a plurality of first spline teeth, said axle includes a plurality of second spline teeth, and said plurality of first spline teeth are meshingly engaged with said plurality of second spline teeth.

15. The work machine of claim 14, wherein:

each of said plurality of first spline teeth include a leading spline tooth surface and a trailing spline tooth surface, each adjacent pair of second spline teeth define a spline gap which defines a leading spline gap surface and a trailing spline gap surface, and when one spline tooth of said first plurality of spline teeth is positioned in a respective spline gap, (i) said leading spline tooth surface is respectively positioned in contact with said leading spline gap surface at all times during operation of said traction assembly, and (ii) said trailing spline tooth surface is spaced apart from in contact with said trailing spline gap surface at all times during operation of said traction assembly.

16. The work machine of claim 15, wherein:

said leading spline tooth defines a lowermost edge surface, said spline gap defines a valley surface interposed between said each adjacent pair of second spline teeth, and said lowermost surface is spaced apart from said valley surface at all times during operation of said traction assembly.

17. The work machine of claim 10, wherein:

said first bearing member includes a sensor bracket secured thereto, and said sensor is secured to said sensor bracket.

18. The work machine of claim 10, wherein:

said first bearing member defines a first cutout area, said second bearing member defines a second cutout area which is aligned with said first cutout area, and said sensor is positioned within said first cutout area and said second cutout area.

\* \* \* \* \*